United States Patent
Hoshino et al.

(10) Patent No.: US 11,384,416 B2
(45) Date of Patent: Jul. 12, 2022

(54) NICKEL-CONTAINING STEEL FOR LOW TEMPERATURE

(71) Applicant: NIPPON STEEL CORPORATION, Tokyo (JP)

(72) Inventors: Manabu Hoshino, Tokyo (JP); Tetsuya Namegawa, Tokyo (JP); Shinichi Omiya, Tokyo (JP); Takayuki Kagaya, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/757,845

(22) PCT Filed: Oct. 26, 2017

(86) PCT No.: PCT/JP2017/038629
§ 371 (c)(1),
(2) Date: Apr. 21, 2020

(87) PCT Pub. No.: WO2019/082325
PCT Pub. Date: May 2, 2019

(65) Prior Publication Data
US 2021/0189535 A1   Jun. 24, 2021

(51) Int. Cl.
| | |
|---|---|
| C22C 38/00 | (2006.01) |
| C22C 38/02 | (2006.01) |
| C22C 38/04 | (2006.01) |
| C22C 38/06 | (2006.01) |
| C22C 38/54 | (2006.01) |
| C21D 6/00 | (2006.01) |
| C21D 8/02 | (2006.01) |
| C21D 9/46 | (2006.01) |
| C22C 38/42 | (2006.01) |
| C22C 38/44 | (2006.01) |
| C22C 38/46 | (2006.01) |
| C22C 38/48 | (2006.01) |
| C22C 38/50 | (2006.01) |

(52) U.S. Cl.
CPC .............. *C22C 38/54* (2013.01); *C21D 6/004* (2013.01); *C21D 6/005* (2013.01); *C21D 6/008* (2013.01); *C21D 8/0205* (2013.01); *C21D 8/0226* (2013.01); *C21D 8/0263* (2013.01); *C21D 9/46* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C21D 2211/001* (2013.01)

(58) Field of Classification Search
CPC ....... C22C 38/001; C22C 38/02; C22C 38/04; C22C 38/06

USPC ............................................... 420/83
See application file for complete search history.

(56) References Cited

U.S. PATENT DOCUMENTS

2017/0314092 A1   11/2017   Nakamura

FOREIGN PATENT DOCUMENTS

| | | | |
|---|---|---|---|
| CN | 101864537 A | 10/2010 | |
| CN | 102766802 A | 11/2012 | |
| EP | 2 460 904 A2 | 6/2012 | |
| EP | 2460904 A2 * | 6/2012 | ............. C22C 38/42 |
| EP | 2 987 885 A1 | 2/2016 | |
| EP | 3 392 361 A1 | 10/2018 | |
| JP | 56-152920 A | 11/1981 | |
| JP | 3-223442 A | 10/1991 | |
| JP | 7-109550 A | 4/1995 | |
| JP | 8-60237 A | 3/1996 | |
| JP | 9-20922 A | 1/1997 | |
| JP | 9-41036 A | 2/1997 | |
| JP | 9-41088 A | 2/1997 | |
| JP | 9-143557 A | 6/1997 | |
| JP | 9-256039 A | 9/1997 | |
| JP | 2004-339569 A | 12/2004 | |
| JP | 2009-235492 A | 10/2009 | |
| JP | 2011-21243 A | 2/2011 | |
| JP | 2011-219849 A | 11/2011 | |
| JP | 2013-213273 A | 10/2013 | |
| JP | 2014-34708 A | 2/2014 | |
| JP | 2014-210948 A | 11/2014 | |
| JP | 5709881 B2 | 4/2015 | |
| JP | 2015-86403 A | 5/2015 | |

(Continued)

OTHER PUBLICATIONS

Michler et al. EP 2460904 A2 machine translation, Jun. 6, 2021, entire translation (Year: 2012).*
Nakamura et al., JP 2017/008413 A machine translation, Jan. 12, 2017, entire translation (Year: 2017).*
"Standard Test Method for Measurement of Fracture Toughness", ASTM International, Designation: E1820-13, Jan. 2014, total 54 pages.
International Search Report, issued in PCT/JP2017/038615, dated Jan. 16, 2018.

(Continued)

*Primary Examiner* — Humera N. Sheikh
*Assistant Examiner* — Katherine A Christy
(74) *Attorney, Agent, or Firm* — Birch, Stewart, Kolasch & Birch, LLP

(57) ABSTRACT

This nickel-containing steel for low temperature includes, as a chemical composition, by mass %: C: 0.020% to 0.070%; Si: 0.03% to 0.30%; Mn: 0.20% to 0.80%; Ni: 12.5% to 17.4%; Al: 0.010% to 0.060%; N: 0.0015% to 0.0060%; and O: 0.0007% to 0.0030%, in which a metallographic structure contains 2.0% to 30.0% of an austenite phase by volume fraction %, in a thickness middle portion of a section parallel to a rolling direction and a thickness direction, an average grain size of prior austenite grains is 3.0 μm to 20.0 μm, and an average aspect ratio of the prior austenite grains is 1.0 to 2.9.

16 Claims, No Drawings

(56) References Cited

FOREIGN PATENT DOCUMENTS

| | | | |
|---|---|---|---|
| JP | 2016-44332 A | | 4/2016 |
| JP | 2016-176141 A | | 10/2016 |
| JP | 2017-8413 A | | 1/2017 |
| JP | 2017008413 A | * | 1/2017 |
| JP | 2017-115239 A | | 6/2017 |
| JP | 2017-160510 A | | 9/2017 |
| WO | WO 2016/068009 A1 | | 5/2016 |
| WO | WO 2019/082322 A1 | | 5/2019 |
| WO | WO 2019/082324 A1 | | 5/2019 |
| WO | WO 2019/082326 A1 | | 5/2019 |

OTHER PUBLICATIONS

International Search Report, issued in PCT/JP2017/038626, dated Jan. 23, 2018.

International Search Report, issued in PCT/JP2017/038629, dated Jan. 23, 2018.

International Search Report, issued in PCT/JP2017/038632, dated Jan. 30, 2018.

Japanese Notice of Allowance, issued in Application No. 2016-087146, dated Oct. 23, 2019.

Japanese Notice of Allowance, issued in Application No. 2016-087147, dated Oct. 23, 2019.

Japanese Notice of Allowance, issued in Application No. 2016-087161, dated Oct. 23, 2019.

JIS G 0551, "Method of microscopic examination of steel—crystal grain size", 2013, pp. 863-873, total 90 pages including translation.

JIS Z 2241, "Metallic materials—Tensile testing—Method of test at room temperature", 2011, pp. 477-548.

Written Opinion of the International Searching Authority, issued in PCT/JP2017/038629, dated Jan. 23, 2018.

* cited by examiner

US 11,384,416 B2

NICKEL-CONTAINING STEEL FOR LOW TEMPERATURE

TECHNICAL FIELD OF THE INVENTION

The present invention relates to a steel (nickel-containing steel for low temperature) containing nickel (Ni) suitable for uses such as a tank for storing liquid hydrogen, which is mainly used at a low temperature of around −253° C.

RELATED ART

In recent years, expectations for the use of liquid hydrogen as clean energy have increased. Since a steel plate used for a tank that stores and transports a liquefied gas such as liquid hydrogen requires excellent low temperature toughness, austenitic stainless steel which is less likely to undergo brittle fracture has been used. However, although austenitic stainless steel has sufficient low temperature toughness, the yield stress of a general-purpose material at room temperature is about 200 MPa.

In a case where austenitic stainless steel with a low yield stress is applied to a liquid hydrogen tank, there is a limit to the increase in the size of the tank. Furthermore, when the yield stress of the steel is about 200 MPa, the plate thickness thereof needs to exceed 40 mm when the size of the tank is increased. Therefore, an increase in the weight of the tank and an increase in manufacturing cost are problems.

For such problems, for example, Patent Document 1 proposes an austenitic high Mn stainless steel having a plate thickness of 5 mm and a 0.2% proof stress of 450 MPa or more at room temperature.

However, the austenitic high Mn stainless steel disclosed in Patent Document 1 has a large coefficient of thermal expansion. Since it is desirable for a large liquid hydrogen tank to have a low coefficient of thermal expansion due to problems such as fatigue, application of austenitic high Mn stainless steel to a large liquid hydrogen tank is not preferable.

In addition, ferritic 9% Ni steel and 7% Ni steel have been used for a tank for a liquefied natural gas (LNG) (sometimes referred to as an LNG tank) which is representative of liquefied gas storage tanks. Although LNG has a higher liquefaction temperature than liquid hydrogen, 9% Ni steel and 7% Ni steel have excellent low temperature toughness. Furthermore, such 9% Ni steel and 7% Ni steel can also have a yield stress of 590 MPa or more at room temperature. Therefore, 9% Ni steel and 7% Ni steel can also be applied to a large LNG tank.

For example, Patent Document 2 discloses a steel for low temperature service with a plate thickness of 25 mm, which contains 5% to 7.5% of Ni, has a yield stress of more than 590 MPa at room temperature, and a brittle fracture surface ratio of 50% or less in a Charpy test at −233° C. In Patent Document 2, low temperature toughness is secured by setting the volume fraction of residual austenite stable at −196° C. to 2% to 12%.

In addition, Patent Document 3 discloses a steel for low temperature service with a plate thickness of 6 to 50 mm, which contains 5% to 10% of Ni, has a yield stress of more than 590 MPa at room temperature, and has excellent low temperature toughness at −196° C. after strain aging. In Patent Document 3, low temperature toughness after strain aging is secured by setting the volume fraction of residual austenite to 3% or more and the effective grain size to 5.5 μm or less, and introducing appropriate defects into the intragranular structure.

Furthermore, Patent Document 4 discloses a nickel steel plate for low temperature service with a plate thickness of 6 mm, which contains 7.5% to 12% Ni and is excellent in the low temperature toughness of not only the base metal but also a welded heat-affected zone. In Patent Document 4, the Si and Mn contents are reduced so as not to generate martensite-austenite constituents in the welded heat-affected zone, whereby low temperature toughness at −196° C. is secured.

The 9% Ni steel and 7% Ni steel disclosed in Patent Documents 2 to 4 can secure a certain toughness at −196° C. or −233° C. However, as a result of examinations by the present inventors, it was found that the 9% Ni steel and 7% Ni steel disclosed in Patent Documents 2 to 4 cannot obtain sufficient toughness at −253° C., which is the liquefaction temperature of liquid hydrogen.

PRIOR ART DOCUMENT

Patent Document

[Patent Document 1] Japanese Patent No. 5709881
[Patent Document 2] Japanese Unexamined Patent Application, First Publication No. 2014-210948
[Patent Document 3] Japanese Unexamined Patent Application, First Publication No. 2011-219849
[Patent Document 4] Japanese Unexamined Patent Application, First Publication No. H3-223442

DISCLOSURE OF THE INVENTION

Problems to be Solved by the Invention

The present invention has been made in view of such circumstances. An object of the present invention is to provide a nickel-containing steel for low temperature, which has sufficient toughness at −253° C. and a yield stress of 460 MPa or more at room temperature.

Means for Solving the Problem

The present inventors made various kinds of steels in which the amount of Ni, which is an element having an effect of improving low temperature toughness, is set to about 13% to 17%, which is higher than 9% Ni steel in the related art, and conducted numerous examinations on toughness at −253° C. and yield stress at room temperature of these steels. As a result, it was found that it is difficult to secure toughness at an extremely low temperature of around −253° C. by simply increasing the Ni content.

The present invention has been made based on the above findings, and the gist thereof is as follows.

(1) According to an aspect of the present invention, a nickel-containing steel for low temperature includes, as a chemical composition, by mass %: C: 0.020% to 0.070%; Si: 0.03% to 0.30%; Mn: 0.20% to 0.80%; Ni: 12.5% to 17.4%; Al: 0.010% to 0.060%; N: 0.0015% to 0.0060%; O: 0.0007% to 0.0030%; Cu: 0% to 1.00%; Cr: 0% to 1.00%; Mo: 0% to 0.60%; Nb: 0% to 0.020%; V: 0% to 0.080%; Ti: 0% to 0.020%; B: 0% to 0.0020%; Ca: 0% to 0.0040%; REM: 0% to 0.0050%; P: 0.008% or less; S: 0.0040% or less; and a remainder including Fe and impurities, in which a metallographic structure contains 2.0% to 30.0% of an austenite phase by volume fraction %, in a thickness middle portion of a section parallel to a rolling direction and a thickness direction, an average grain size of prior austenite grains is 3.0 μm to 20.0 μm, and an average aspect ratio of the prior austenite grains is 1.0 to 2.9, and a yield stress at room temperature is 460 MPa to 710 MPa, and a tensile strength at room temperature is 560 MPa to 810 MPa.

(2) The nickel-containing steel for low temperature according to (1) may include, as the chemical composition, by mass %: Mn: 0.20% to 0.50%.

(3) In the nickel-containing steel for low temperature according to (1) or (2), the average grain size of the prior austenite grains may be 3.0 μm to 15.0 μm.

(4) In the nickel-containing steel for low temperature according to any one of (1) to (3), an average effective grain size may be 2.0 μm to 12.0 μm.

(5) In the nickel-containing steel for low temperature according to any one of (1) to (4), a plate thickness may be 4.5 mm to 40 mm Effects of the Invention According to the above aspect of the present invention, it is possible to provide a nickel-containing steel for low temperature having excellent toughness at around −253° C., which is sufficient for uses such as a liquid hydrogen tank, and having a high yield stress at room temperature.

EMBODIMENTS OF THE INVENTION

Steel containing about 13% to 17% of Ni contains 4% to 8% more Ni, which is an element having an effect of improving low temperature toughness, than 9% Ni steel. Therefore, securing toughness at a lower temperature can be expected. However, −253° C., which is a toughness evaluation temperature targeted by the present invention, is significantly lower than −165° C. and −196° C., which are evaluation temperatures for 9% Ni steel in the related art.

The present inventors conducted numerous examinations in order to clarify the influence of the amounts of elements and a metallographic structure on the toughness of steel containing about 13% to 17% of Ni at −253° C. As a result, it was found that the toughness at −253° C. is not always sufficient even if the Ni content is simply increased by 4% to 8% with respect to 9% Ni steel.

For the distinction from temperatures such as −165° C. and −196° C. and concise description, hereinafter, a temperature of around −253° C. is referred to as "extremely low temperature" for convenience. That is, an extremely low temperature toughness indicates toughness at −253° C.

Furthermore, the present inventors examined a method of increasing the toughness (extremely low temperature toughness) of steel containing about 13% to 17% of Ni at an extremely low temperature. As a result, it was found that it is particularly important to simultaneously satisfy the five conditions including (a) setting the C content to 0.020% to 0.070%, (b) setting the Si content to 0.03% to 0.30%, (c) setting the Mn content to 0.20% to 0.80%, (d) controlling a prior austenite grain size, and (e) controlling the volume fraction of an austenite phase. Furthermore, the knowledge that the extremely low temperature toughness is further improved by (f) controlling an effective grain size was also obtained.

Hereinafter, a nickel-containing steel for low temperature according to an embodiment of the present invention (hereinafter, sometimes referred to as a nickel-containing steel according to the present embodiment) will be described.

First, the reasons for limiting the composition of the nickel-containing steel according to the present embodiment will be described. Unless otherwise specified, % in contents means mass %.

(C: 0.020% to 0.070%)

C is an element that increases the yield stress at room temperature, and is also an element that contributes to the formation of martensite and austenite. When the C content is less than 0.020%, strength cannot be secured, and extremely low temperature toughness may be decreased due to the formation of coarse bainite or the like. Therefore, the C content is set to 0.020% or more. A preferable C content is 0.025% or more.

On the other hand, when the C content exceeds 0.070%, it is easy for cementite to precipitate at prior austenite grain boundaries. In this case, fracture occurs at grain boundaries, and the extremely low temperature toughness is decreased. Therefore, the C content is set to 0.070% or less. The C content is preferably 0.060% or less, more preferably 0.050% or less, and even more preferably 0.045% or less.

(Si: 0.03% to 0.30%)

Si is an element that increases the yield stress at room temperature. When the Si content is less than 0.03%, the effect of improving the yield stress at room temperature is small. Therefore, the Si content is set to 0.03% or more. A preferable Si content is 0.05% or more.

On the other hand, when the Si content exceeds 0.30%, cementite at the prior austenite grain boundaries is likely to be coarsened, fracture occurs at the grain boundaries, and the extremely low temperature toughness is decreased. Therefore, it is extremely important to limit the Si content to 0.30% or less in order to secure the extremely low temperature toughness. The Si content is preferably 0.20% or less, more preferably 0.15% or less, and even more preferably 0.10% or less.

(Mn: 0.20% to 0.80%)

Mn is an element that increases the yield stress at room temperature. When the Mn content is less than 0.20%, not only a sufficient yield stress cannot be secured, but also the extremely low temperature toughness may be decreased due to the formation of coarse bainite or the like. Therefore, the Mn content is set to 0.20% or more. A preferable Mn content is 0.25% or more, 0.30% or more, or 0.35% or more.

On the other hand, when the Mn content exceeds 0.80%, Mn segregated at the prior austenite grain boundaries and MnS coarsely precipitated cause fractures at the grain boundaries, and the extremely low temperature toughness is decreased. Therefore, it is extremely important to limit the Mn content to 0.80% or less in order to secure the extremely low temperature toughness. The Mn content is preferably 0.60% or less, more preferably 0.50% or less, and even more preferably 0.45% or less or 0.40% or less.

(Ni: 12.5% to 17.4%)

Ni is an essential element for securing the extremely low temperature toughness. When the Ni content is less than 12.5%, a manufacturing load is increased. Therefore, the Ni content is set to 12.5% or more. A preferable Ni content is 12.8% or more, or 13.1% or more. On the other hand, Ni is an expensive element, and when more than 17.4% of Ni is contained, the economy is impaired. Therefore, the Ni content is limited to 17.4% or less. In order to reduce an alloy cost, the upper limit thereof may be set to 16.5%, 15.5%, 15.0%, or 14.5%.

(Al: 0.010% to 0.060%)

Al is an element effective for deoxidation of steel. In addition, Al is also an element that forms AlN and contributes to the refinement of the metallographic structure and a reduction in the amount of solute N, which lowers the extremely low temperature toughness. When the Al content is less than 0.010%, the effect of deoxidation, the effect of the refinement of the metallographic structure, and the effect of the reduction in the amount of solute N are small. Therefore, the Al content is set to 0.010% or more. The Al content is preferably 0.015% or more, and more preferably 0.020% or more.

On the other hand, when the Al content exceeds 0.060%, the extremely low temperature toughness is decreased. Therefore, the Al content is set to 0.060% or less. A more preferable Al content is 0.040% or less.

(N: 0.0015% to 0.0060%)

N is an element that forms a nitride such as AlN. When the N content is less than 0.0015%, fine AlN that suppresses the coarsening of the austenite grain size is not sufficiently formed during a heat treatment, and there are cases where the austenite grains become coarse and the extremely low temperature toughness is decreased. For this reason, the N content is set to 0.0015% or more. The N content is preferably set to 0.0020% or more.

On the other hand, when the N content exceeds 0.0060%, the amount of solute N increases or AlN coarsens, resulting in the decrease in extremely low temperature toughness. For this reason, the N content is set to 0.0060% or less. The N content is preferably 0.0050% or less, and more preferably 0.0040% or less.

(O: 0.0007% to 0.0030%)

O is an impurity. Therefore, it is desirable that the O content is small. However, since a reduction in the O content to less than 0.0007% causes an increase in cost, the O content is set to 0.0007% or more.

On the other hand, when the O content exceeds 0.0030%, there are cases where $Al_2O_3$ clusters increase and the extremely low temperature toughness is decreased. Therefore, the O content is set to 0.0030% or less. The O content is preferably 0.0025% or less, more preferably 0.0020% or less, and even more preferably 0.0015% or less.

(P: 0.008% or Less)

P is an element that causes grain boundary embrittlement at the prior austenite grain boundaries and is thus harmful to the extremely low temperature toughness. Therefore, it is desirable that the P content is small. When the P content exceeds 0.008%, the extremely low temperature toughness is significantly decreased. Therefore, the P content is limited to 0.008% or less. The P content is preferably 0.006% or less, more preferably 0.004% or less, and even more preferably 0.003% or less. P is incorporated as an impurity during the manufacturing of molten steel. The lower limit thereof does not need to be particularly limited, and the lower limit thereof is 0%. However, since an excessive increase in the melting cost is required to reduce the P content to 0.0003% or less, the lower limit of the P content may be set to 0.0003%. As necessary, the lower limit thereof may be set to 0.0005% or 0.0010%.

(S: 0.0040% or Less)

S is an element that forms MnS, which becomes a brittle fracture origin, and is thus harmful to the extremely low temperature toughness. Although it is preferable that the S content is small, when the S content exceeds 0.0040%, the extremely low temperature toughness is significantly decreased. Therefore, the S content is limited to 0.0040% or less. The S content is preferably 0.0030% or less, more preferably 0.0020% or less, and even more preferably 0.0010% or less. There are cases where S is incorporated as an impurity during the manufacturing of molten steel. However, the lower limit thereof does not need to be particularly limited, and the lower limit thereof is 0%. However, since an excessive increase in the melting cost is required to reduce the S content to 0.0002% or less, the lower limit of the S content may be set to 0.0002%. As necessary, the lower limit thereof may be set to 0.0004% or 0.0006%.

The nickel-containing steel according to the present embodiment basically contains the above-mentioned elements and the remainder consisting of Fe and impurities, but may contain one or more selected from the group consisting of Cu, Cr, Mo, Nb, V, Ti, B, Ca, and REM, which are described below, for the purpose of further improving the yield stress and extremely low temperature toughness.

(Cu: 0% to 1.00%)

Cu is an element that increases the yield stress at room temperature. Therefore, Cu may be contained. However, when the Cu content exceeds 1.00%, the extremely low temperature toughness is decreased. Therefore, even in a case where Cu is contained, the Cu content is set to 1.00% or less. The Cu content is preferably 0.70% or less, more preferably 0.50% or less, and even more preferably 0.30% or less.

There are cases where Cu is incorporated as an impurity from scrap or the like during the manufacturing of molten steel. However, the lower limit of the Cu content does not need to be particularly limited, and the lower limit thereof is 0%.

(Cr: 0% to 1.00%)

Cr is an element that increases the yield stress at room temperature. Therefore, Cr may be contained. However, when the Cr content exceeds 1.00%, the extremely low temperature toughness is decreased. Therefore, even in a case where Cr is contained, the Cr content is set to 1.00% or less. The Cr content is preferably 0.70% or less, more preferably 0.50% or less, and even more preferably 0.30% or less.

There are cases where Cr is incorporated as an impurity from scrap or the like during the manufacturing of molten steel. However, the lower limit of the Cr content does not need to be particularly limited, and the lower limit thereof is 0%.

(Mo: 0% to 0.60%)

Mo is an element that increases the yield stress at room temperature, and is also an element that has an effect of suppressing grain boundary embrittlement. In order to obtain these effects, Mo may be contained. However, Mo is an expensive element, and when the Mo content exceeds 0.60%, the economy is impaired. Therefore, even in a case where Mo is contained, the Mo content is limited to 0.60% or less. In order to improve the economy, the upper limit thereof may be set to 0.50%, 0.40%, 0.30%, or 0.25%.

There are cases where Mo is incorporated as an impurity from scrap or the like during the manufacturing of molten steel. However, the lower limit of the Mo content does not need to be particularly limited, and the lower limit thereof is 0%. As necessary, the lower limit thereof may be set to 0.05%, 0.10%, or 0.15% in order to improve the yield stress.

(Nb: 0% to 0.020%)

Nb is an element that increases the yield stress at room temperature, and is also an element that has an effect of improving the extremely low temperature toughness by refining the metallographic structure. In order to obtain these effects, Nb may be contained. However, when the Nb content exceeds 0.020%, the extremely low temperature toughness is decreased. Therefore, even in a case where Nb is contained, the Nb content is set to 0.020% or less. The Nb content is preferably 0.015% or less, and more preferably 0.010% or less.

There are cases where Nb is incorporated as an impurity from scrap or the like during the manufacturing of molten steel. However, the lower limit of the Nb content does not need to be particularly limited, and the lower limit thereof is 0%.

(V: 0% to 0.080%)

V is an element that increases the yield stress at room temperature. Therefore, V may be contained. However, when the V content exceeds 0.080%, the extremely low temperature toughness is decreased. Therefore, even in a case where V is contained, the V content is set to 0.080% or less. The V content is preferably 0.060% or less, and more preferably 0.040% or less.

There are cases where V is incorporated as an impurity from scrap or the like during the manufacturing of molten steel. However, the lower limit of the V content does not need to be particularly limited, and the lower limit thereof is 0%.

(Ti: 0% to 0.020%)

Ti is an element that forms TiN and contributes to the refinement of the metallographic structure and a reduction in the amount of solute N that lowers the extremely low temperature toughness. In order to obtain these effects, Ti may be contained. However, when the Ti content exceeds 0.020%, the extremely low temperature toughness is decreased. Therefore, even in a case where Ti is contained, the Ti content is set to 0.020% or less. The Ti content is preferably 0.015% or less, and more preferably 0.010% or less.

There are cases where Ti is incorporated as an impurity from scrap or the like during the manufacturing of molten steel. However, the lower limit of the Ti content does not need to be particularly limited, and the lower limit thereof is 0%.

(B: 0% to 0.0020%)

B is an element that increases the yield stress at room temperature. B is an element that forms BN and contributes to a reduction in the amount of solute N, which lowers the extremely low temperature toughness. In order to obtain these effects, B may be contained. However, when the B content exceeds 0.0020%, the extremely low temperature toughness is decreased. Therefore, even in a case where B is contained, the B content is set to 0.0020% or less. The B content is preferably 0.0015% or less, more preferably 0.0012% or less, and even more preferably 0.0010% or less or 0.0003% or less.

There are cases where B is incorporated as an impurity from scrap or the like during the manufacturing of molten steel. However, the lower limit of the B content does not need to be particularly limited, and the lower limit thereof is 0%.

(Ca: 0% to 0.0040%)

Ca is an element that is bonded to S to form spherical sulfides or oxysulfides and reduces the formation of MnS, which is a cause of the decrease in the extremely low temperature toughness, by being stretched by hot rolling, thereby being effective in improving the extremely low temperature toughness. In order to obtain this effect, Ca may be contained. However, when the Ca content exceeds 0.0040%, sulfides and oxysulfides containing Ca are coarsened, and the extremely low temperature toughness is decreased. For this reason, even in a case where Ca is contained, the Ca content is limited to 0.0040% or less. The Ca content is preferably 0.0030% or less or 0.0010% or less.

There are cases where Ca is incorporated as an impurity from scrap or the like during the manufacturing of molten steel. However, the lower limit of the Ca content does not need to be particularly limited, and the lower limit thereof is 0%.

(REM: 0% to 0.0050%)

Like Ca, a rare-earth metal (REM) is an element that is bonded to S to form spherical sulfides or oxysulfides, and reduces the amount of MnS, which is a cause of the decrease in the extremely low temperature toughness, by being stretched by hot rolling, thereby being effective in improving the extremely low temperature toughness. In order to obtain this effect, REM may be contained. However, when the REM content exceeds 0.0050%, sulfides and oxysulfides containing REM are coarsened, and the extremely low temperature toughness is decreased. For this reason, even in a case where REM is contained, the REM content is limited to 0.0050% or less. The REM content is limited to preferably 0.0040% or less, or 0.0010% or less.

There are cases where REM is incorporated as an impurity from scrap or the like during the manufacturing of molten steel. However, the lower limit of the REM content does not need to be particularly limited, and the lower limit thereof is 0%.

The nickel-containing steel according to the present embodiment contains or limits the above-mentioned elements, and the remainder consists of iron and impurities. Here, the impurities mean elements that are incorporated due to various factors in the manufacturing process, including raw materials such as ore and scrap, when steel is industrially manufactured, and the impurities are allowed in a range in which the present invention is not adversely affected. However, in the present invention, it is necessary to individually define the upper limits of P and S among the impurities as described above.

In addition to the above-mentioned elements, the nickel-containing steel according to the present embodiment may contain the following alloying elements as impurities from auxiliary raw materials such as scrap. The amounts of these elements are preferably limited to the ranges described later for the purpose of further improving the strength, extremely low temperature toughness, and the like of the steel itself.

Sb is an element that impairs the extremely low temperature toughness. Therefore, the Sb content is preferably 0.005% or less, more preferably 0.003% or less, and even more preferably 0.001% or less.

Sn is an element that impairs the extremely low temperature toughness. Therefore, the Sn content is preferably 0.005% or less, more preferably 0.003% or less, and even more preferably 0.001% or less.

As is an element that impairs the extremely low temperature toughness. Therefore, the As content is preferably 0.005% or less, more preferably 0.003% or less, and even more preferably 0.001% or less.

Moreover, in order to fully exhibit the effect of the nickel-containing steel according to the present embodiment, it is preferable to limit the amount of each of Co, Zn, and W to 0.010% or less or 0.005% or less.

There is no need to limit the lower limits of Sb, Sn, As, Co, Zn, and W, and the lower limit of each of the elements is 0%. Moreover, even if an alloying element (for example, P, S, Cu, Cr, Mo, Nb, V, Ti, B, Ca, and REM) with no defined lower limit is intentionally added or incorporated as an impurity, when the amount thereof is within the above-described range, the steel is interpreted as being within the range of the present embodiment.

Next, the metallographic structure of the nickel-containing steel according to the present embodiment will be described.

The present inventors newly found that fracture is likely to occur at the prior austenite grain boundaries at an extremely low temperature, and the fracture at the prior austenite grain boundaries causes a decrease in toughness.

The nickel-containing steel according to the present embodiment is manufactured by being subjected to hot rolling and water cooling or air cooling and then passed through a plurality of heat treatments including reheating hardening, an intermediate heat treatment, and tempering. In the present embodiment, the prior austenite grain boundaries are grain boundaries of austenite that have existed mainly during heating of the reheating hardening. A large proportion of prior austenite grains that have existed during reheating hardening are coarse. It is considered that Mn, P, and Si are segregated at the coarse prior austenite grain boundaries, and these elements lower the bonding force of the prior austenite grain boundaries and promote the occurrence of fracture at the prior austenite grain boundaries at an extremely low temperature.

Austenite grain boundaries are newly generated during the intermediate heat treatment, and the austenite grain boundaries generated during the intermediate heat treatment also become prior austenite grain boundaries after the tempering. However, the temperature of the intermediate heat treatment in the manufacturing of the nickel-containing steel according to the present embodiment is as low as 570° C. to 630° C., and there are very few austenite grains newly generated during the intermediate heat treatment. The amount of Mn, P, and Si that are segregated at prior austenite grain boundaries which are not coarse is relatively small. For this reason, it is considered that fracture from the prior austenite grain boundaries (most of which are prior austenite grain boundaries generated during the intermediate heat treatment) which are not coarse among the prior austenite grain boundaries is relatively unlikely to occur.

Therefore, in order to secure the extremely low temperature toughness, the grain size of the prior austenite grains segregated with a large amount of Mn, P, and Si is substantially important. Therefore, in a case of measuring the grain size and aspect ratio of the prior austenite grains, only coarse prior austenite grains are measured.

In the present embodiment, whether or not the prior austenite grains are coarse is determined based on whether or not the grain size of the prior austenite grains is 2.0 μm or more. That is, the prior austenite grains having a grain size of less than 2.0 μm are determined to be prior austenite grains having little segregation of Mn, P, and Si and not impairing the extremely low temperature toughness, and the average grain size and average aspect ratio of prior austenite grains are obtained by measuring the average grain size and average aspect ratio of the prior austenite grains excluding the prior austenite grains having a grain size of less than 2.0 μm (that is, for the prior austenite grains having a grain size of 2.0 μm or more).

The present inventors conducted numerous examinations on methods for suppressing fracture at the prior austenite grain boundaries at an extremely low temperature. As a result, it was found that it is important to set the C content to 0.070% or less, the Mn content to 0.80% or less, the P content to 0.008% or less, the Si content to 0.30% or less, the average grain size of the prior austenite grains to 20.0 μm or less, and the volume fraction of residual austenite to 2.0% to 30.0% in order to suppress fracture at the prior austenite grain boundaries and secure the extremely low temperature toughness.

As described above, it is presumed that at an extremely low temperature, fracture is likely to occur selectively in a portion where the bonding force is relatively weak, such as a grain boundary of coarse prior austenite grains. Therefore, it is considered that the decrease in the bonding force of the prior austenite grain boundaries can be suppressed by suppressing cementite that weakens the bonding force of the coarse prior austenite grain boundaries and segregation of Mn and P. Moreover, an increase in the C content and the Si content and coarsening of the prior austenite grains promote the coarsening of intergranular cementite. Therefore, the suppression of the C content and the Si content and the refinement of the prior austenite grain size are effective in suppressing the fracture at the prior austenite grain boundaries at an extremely low temperature.

Hereinafter, the reasons for limiting the metallographic structure of the nickel-containing steel according to the present embodiment will be described.

(Average Grain Size of Prior Austenite Grains: 3.0 to 20.0 μm)

The average grain size of the prior austenite grains (measured excluding the prior austenite having a grain size of less than 2.0 μm) needs to be 3.0 to 20.0 μm. Reducing the average grain size of prior austenite grains to less than 3.0 μm is accompanied by an increase in manufacturing cost such as an increase in the number of heat treatments. Therefore, the average grain size of the prior austenite grains is set to 3.0 μm or more.

On the other hand, when the average grain size of the prior austenite grains exceeds 20.0 μm, cementite precipitated at the prior austenite grain boundaries becomes coarse, or the concentration of Mn and P at the grain boundaries is increased. Precipitation of coarse cementite and concentration of Mn and P weaken the bonding force of the prior austenite grain boundaries and cause fractures at the prior austenite grain boundaries or brittle fracture origins, thereby reducing the extremely low temperature toughness. Therefore, the average grain size of the prior austenite grains is set to 20.0 μm or less. The average grain size of the prior austenite grains is preferably 15.0 μm or less or 13.0 μm or less, and more preferably 11.0 μm or less, 10.0 μm or less, or 8.8 μm or less.

As described above, the average grain size of the prior austenite grains is the average grain size of the prior austenite grains corresponding to the grain boundaries of austenite that have existed during heating of the reheating hardening.

(Average Aspect Ratio of Prior Austenite Grains: 1.0 to 2.9)

The aspect ratio of the prior austenite grains is the ratio between the length and thickness of the prior austenite grains in a section (L-section) parallel to a rolling direction and a thickness direction, that is, (the length of the prior austenite grains in the rolling direction)/(the thickness of the prior austenite grains in the thickness direction).

In the nickel-containing steel according to the present embodiment, the average aspect ratio of the prior austenite grains becomes 2.9 or less in a case where a preferable manufacturing method, which will be described below, is applied to the steel having the above-described chemical composition so as to include other properties. The upper limit thereof may be set to 2.5, 2.2, 2.0, 1.9, or 1.7 as necessary.

The lower limit of the aspect ratio is in a case where the length and thickness of the prior austenite grains are the same, and the average aspect ratio is 1.0 or more. The lower limit thereof may be set to 1.2, 1.3, or 1.4 as necessary.

The average grain size and the average aspect ratio of the prior austenite grains are measured using a section (L-section) of a thickness middle portion parallel to the rolling direction and the thickness direction as an observed section. The average grain size of the prior austenite grains is measured by corroding the observed section with a saturated aqueous solution of picric acid to reveal the prior austenite grain boundaries, and thereafter photographing five or more visual fields with a scanning electron microscope (SEM) at a magnification of 1,000-fold or 2,000-fold.

After identifying the prior austenite grain boundaries using the SEM photographs, the circle equivalent grain sizes (diameters) of at least 20 prior austenite grains having a circle equivalent grain size (diameter) of 2.0 µm or more are obtained by image processing, and the average value thereof is determined as the average grain size of the prior austenite grains.

In addition, regarding the average aspect ratio of the prior austenite grains, the ratios (aspect ratios) between the length in the rolling direction and the thickness in the thickness direction of at least 20 prior austenite grains having a circle equivalent grain size (diameter) of 2.0 µm or more are measured using the SEM photographs, and the average value thereof is determined as the average aspect ratio of the prior austenite.

(Volume Fraction of Austenite Phase: 2.0% to 30.0%)

In order to secure the extremely low temperature toughness, an austenite phase needs to be contained in a volume fraction of 2.0% or more. Therefore, the volume fraction of the austenite phase is set to 2.0% or more. This austenite phase is different from the prior austenite grains and is an austenite phase present in a nickel-containing steel after a heat treatment. It is considered that in a case where an austenite phase which is stable even at an extremely low temperature is present, applied stress and strain are relieved by the plastic deformation of austenite, and thus toughness is improved.

The austenite phase is relatively uniformly and finely generated at the prior austenite grain boundaries, the block boundaries and lath boundaries of tempered martensite, and the like.

That is, it is considered that the austenite phase is present in the vicinity of a hard phase, which is likely to be a brittle fracture origin, relieves the concentration of stress or strain around the hard phase, and thus contributes to the suppression of the occurrence of brittle fracture. Furthermore, it is considered that when an austenite phase with a volume fraction of 2.0% or more is generated, coarse cementite, which becomes a brittle fracture origin, can be significantly reduced. The lower limit of the volume fraction of the austenite phase may be set to 3.5%, 5.0%, 6.0%, or 7.0% as necessary.

On the other hand, when the volume fraction of the austenite phase is increased, the concentration of C or the like into the austenite phase becomes insufficient, and the possibility of transformation into martensite at an extremely low temperature is increased. Unstable austenite that transforms into martensite at an extremely low temperature reduces the extremely low temperature toughness. Therefore, the volume fraction of the austenite phase is set to 30.0% or less. The upper limit thereof may be set to 25.0%, 20.0%, 17.0%, 14.0% or 12.0% as necessary.

The volume fraction of the austenite phase may be measured by an X-ray diffraction method by taking a sample from the thickness middle portion of the steel after tempering. Specifically, the taken sample is subjected to X-ray diffraction, and the volume fraction of the austenite phase may be measured from the ratio between the integrated intensities of the (111) plane, (200) plane, and (211) plane of an α phase having a BCC structure and the integrated intensities of the (111) plane, (200) plane, and (220) plane of an austenite phase having a FCC structure. A treatment (so-called deep cooling treatment) for cooling a test piece to an extremely low temperature is unnecessary before the measurement of the volume fraction of the austenite phase. However, in a case where only a test piece after being subjected to a deep cooling treatment is present, the volume fraction of the austenite phase may be measured using the test piece after being subjected to the deep cooling treatment.

The remainder other than the austenite phase in the metallographic structure of the nickel-containing steel according to the present embodiment is mainly tempered martensite. In order to manufacture a nickel-containing steel in which the average grain size and average aspect ratio of prior austenite grains are within the above-described ranges, it is necessary to perform the reheating hardening, the intermediate heat treatment, and the tempering after the hot rolling. In a case where such a manufacturing method is applied to a steel having the above-described chemical composition, the remainder of the obtained metallographic structure (that is, the primary phase) is tempered martensite. However, there are cases where the nickel-containing steel according to the present embodiment contains a phase (for example, coarse inclusions) in which the remainder of the metallographic structure is not classified as either austenite or tempered martensite. In a case where the total volume fraction of the austenite phase and the tempered martensite phase in the metallographic structure of the thickness middle portion is 99% or more, the inclusion of phases other than these is allowed.

In a case of measuring the volume fraction of the tempered martensite phase, the area fraction measured by microstructure observation using nital as a corrosive solution is used as the volume fraction as it is (this is because the area fraction is basically the same as the volume fraction).

(Average Effective Grain Size: 2.0 to 12.0 µm)

In the case of further improving the extremely low temperature toughness, the average effective grain size is preferably set to 2.0 µm or more and 12.0 µm or less. Effective grains are regions having substantially the same crystal orientation, and the size of the region is the effective grain size. When the effective grain size is refined, resistance to propagation of fracture cracks is increased and the toughness is further improved. However, reducing the average effective grain size to less than 2.0 µm is accompanied by an increase in manufacturing cost such as an increase in the number of heat treatments. Therefore, the average effective grain size is set to 2.0 µm or more. The lower limit thereof may be set to 2.5 µm, 3.0 µm, or 3.5 µm as necessary.

On the other hand, when the average effective grain size exceeds 12.0 µm, there are cases where stress exerted on hard phases that become the brittle fracture origins, that is, inclusions such as coarse cementite, coarse AlN, MnS, and alumina in the prior austenite grain boundaries and tempered martensite increases, and the extremely low temperature toughness is decreased. Therefore, the average effective grain size is preferably set to 12.0 µm or less. The upper limit thereof may be set to 10.0 µm, 8.5 µm, or 7.5 µm as necessary.

The average effective grain size is measured by taking a sample from the steel after the tempering and using an electron backscatter diffraction (EBSD) analyzer with a section (L-section) of the thickness middle portion parallel to the rolling direction and the thickness direction as an observed section. Observation of five or more visual fields is performed at a magnification of 2,000-fold, and a boundary of a metallographic structure having an orientation difference of 15° or more is regarded as a grain boundary. Using grains surrounded by the grain boundaries as effective grains, the circle equivalent grain size (diameter) is obtained from the area of the effective grains by image processing, and the average value of the circle equivalent grain sizes is determined as the average effective grain size.

The nickel-containing steel according to the present embodiment is mainly a steel plate. In consideration of application to a low-temperature tank for storing liquid hydrogen or the like, the yield stress at room temperature is set to 460 to 710 MPa, and the tensile strength is set to 560 to 810 MPa. The lower limit of the yield stress may be set to 470 MPa, 500 MPa, or 520 MPa. The upper limit of the yield stress may be set to 690 MPa, 670 MPa, or 650 MPa. The lower limit of the tensile strength may be set to 580 MPa, 600 MPa, or 620 MPa. The upper limit of the tensile strength may be set to 780 MPa, 760 MPa, or 750 MPa. In the present embodiment, the room temperature is 20° C.

The plate thickness is preferably 4.5 to 40 mm. A nickel-containing steel with a plate thickness of less than 4.5 mm is rarely used as a material for a large scale structure such as a liquid hydrogen tank, so that the lower limit of the plate thickness is set to 4.5 mm. In a case where the plate thickness is more than 40 mm, the cooling rate during the reheating hardening is extremely slow, and it is very difficult to secure the low temperature toughness in the compositional range of the present application (particularly, the Ni content). As necessary, the lower limit of the plate thickness may be set to 6 mm, 8 mm, 10 mm, or 12 mm, and the upper limit of the plate thickness may be set to 36 mm, 32 mm, or 28 mm Next, a method of manufacturing the nickel-containing steel according to the present embodiment will be described. If the nickel-containing steel according to the present embodiment has the above-described configuration regardless of the manufacturing method, the effect can be obtained. However, for example, according to the following manufacturing method, the nickel-containing steel according to the present embodiment can be obtained stably.

As the nickel-containing steel according to the present embodiment, a steel having a predetermined chemical composition is melted and a steel piece is manufactured by continuous casting. The obtained steel piece is heated and subjected to hot rolling. After the hot rolling, water cooling or air cooling is performed. Thereafter, a heat treatment is performed thereon in which reheating hardening, an intermediate heat treatment, and tempering are sequentially performed.

Hereinafter, each step will be described. The following conditions show an example of manufacturing conditions. As long as a steel within the range of the present invention can be obtained, deviation from the conditions described below does not particularly cause a problem.

<Melting and Casting>

At the time of melting the nickel-containing steel according to the present embodiment, for example, the molten steel temperature is set to 1650° C. or lower, and the amounts of the elements are adjusted.

After the melting, the molten steel is subjected to continuous casting to manufacture a steel piece.

21 Hot Rolling>

Hot rolling is performed on the steel piece.

The heating temperature of the hot rolling is 950° C. or higher and 1180° C. or lower. When the heating temperature is lower than 950° C., there are cases where the heating temperature is lower than a predetermined hot rolling finishing temperature. On the other hand, when the heating temperature exceeds 1180° C., austenite grain sizes become coarse during the heating, and the extremely low temperature toughness may decrease. The retention time of the heating is 30 minutes to 180 minutes.

A cumulative rolling reduction at 950° C. or lower during the hot rolling is 80% or more. By setting the cumulative rolling reduction to 80% or more, austenite grains can be refined by recrystallization of austenite. In addition, by setting the cumulative rolling reduction to 80% or more, the spacing between segregation bands of Ni present in the steel piece can be reduced. Since the austenite grains formed during the intermediate heat treatment are preferentially formed from the segregation bands, the effective grain size after tempering can be refined by reducing the segregation spacing by rolling.

On the other hand, when the cumulative rolling reduction at 950° C. or lower exceeds 95%, the rolling time becomes long and problems occur in productivity in some cases, so that the upper limit of the cumulative rolling reduction at 950° C. or lower is 95% or lower.

Homogenous refinement of prior austenite grains by recrystallization during rolling is particularly important in securing the extremely low temperature toughness of the present invention, and strict restriction on the rolling temperature and the cumulative rolling reduction is required.

When the finishing temperature of the hot rolling is lower than 650° C., deformation resistance is increased and the load on a rolling mill is increased. Therefore, the finishing temperature of the hot rolling is 650° C. or higher.

On the other hand, when the finishing temperature of the hot rolling exceeds 920° C., dislocations introduced by rolling may be reduced due to recovery, and there are cases where prior austenite grains are coarsened. Therefore, the finishing temperature of the hot rolling is 920° C. or lower. A preferable hot rolling finishing temperature is 880° C. or lower.

Although cooling performed on the steel plate after the hot rolling may be either water cooling or air cooling, it is preferable to perform water cooling to near room temperature. Specifically, it is preferable to start water cooling immediately after the hot rolling is finished and perform cooling to 200° C. or lower.

<Reheating Hardening>

After the hot rolling, reheating hardening is performed on the steel plate cooled to near room temperature.

The reheating hardening is effective for refining the prior austenite grains, and the heating temperature is set to 700° C. or higher and 880° C. or lower. When the heating temperature of the reheating hardening (reheating hardening temperature) is lower than 700° C., a portion that does not transform into austenite remains, and there are cases where the yield stress or tensile strength at room temperature is decreased.

On the other hand, when the reheating hardening temperature exceeds 880° C., the prior austenite grain sizes become coarse.

The retention time during the reheating hardening is set to 20 to 180 minutes. When the retention time is shorter than 20 minutes, there are cases where austenitic transformation is insufficient. When the retention time is longer than 180 minutes, there is concern that austenite grains may become coarse.

As cooling during the reheating hardening, water cooling to 200° C. or lower is performed at an average cooling rate of 10 °C./s or more.

<Intermediate Heat Treatment>

The intermediate heat treatment is performed on the steel plate after the reheating hardening.

The intermediate heat treatment is effective in securing an austenite phase having a predetermined volume fraction that contributes to the improvement of the extremely low temperature toughness. It is also effective in reducing the effective grain size.

The heating temperature of the intermediate heat treatment is set to 570° C. to 630° C. When the heating temperature of the intermediate heat treatment (intermediate heat treatment temperature) is lower than 570° C., the austenitic transformation becomes insufficient, and there are cases where the volume fraction of the austenite phase is decreased.

On the other hand, when the temperature of the intermediate heat treatment exceeds 630° C., the austenitic transformation proceeds excessively. As a result, austenite may not be sufficiently stabilized, and an austenite phase having a volume fraction of 2.0% or more may not be secured.

The retention time of the intermediate heat treatment is set to 20 minutes to 180 minutes. When the retention time is shorter than 20 minutes, there are cases where the austenitic transformation is insufficient. When the retention time is longer than 180 minutes, there is concern that carbides may precipitate.

After the retention, in order to avoid tempering embrittlement, water cooling to 200° C. or lower is performed at an average cooling rate of 8° C./s or more.

<Tempering>

The tempering is performed on the steel plate after the intermediate heat treatment. The tempering is also effective in securing an austenite phase having a predetermined volume fraction. The heating temperature of the tempering (tempering temperature) is set to 520° C. to 570° C. When the heating temperature of the tempering is lower than 520° C., the austenite phase cannot be secured in a volume fraction of 2.0% or more, and there are cases where the extremely low temperature toughness is insufficient.

On the other hand, when the upper limit of the tempering temperature exceeds 570° C., there is concern that the austenite phase at room temperature may exceeds 30.0% in terms of volume fraction. When such a steel plate is cooled to an extremely low temperature, a part of austenite is transformed into high C martensite, and there are cases where the extremely low temperature toughness is decreased. For this reason, the upper limit of the tempering temperature is 570° C. The retention time of the tempering is set to 20 minutes to 180 minutes. When the retention time is shorter than 20 minutes, there are cases where the stability of austenite is insufficient. When the retention time is longer than 180 minutes, there is concern that carbides may precipitate or the strength maybe excessively reduced.

In order to avoid tempering embrittlement, as a cooling method after the retention, water cooling to 200° C. or lower is preferably performed at an average cooling rate of 5 ° C./s or more.

According to the manufacturing method described above, it is possible to obtain a nickel-containing steel for low temperature having an extremely low temperature toughness sufficient for use in a liquid hydrogen tank and having a high yield stress at room temperature.

EXAMPLES

Hereinafter, examples of the present invention are described. The following examples are examples of the present invention, and the present invention is not limited to the examples described below.

Steel was melted by a converter and slabs having a thickness of 150 mm to 400 mm were manufactured by continuous casting. Tables 1 and 2 show the chemical compositions of Steels A1 to A25. These slabs were heated, subjected to controlled rolling, directly subjected to water cooling or air cooling to 200° C. or lower, and subjected to heat treatments including reheating hardening, an intermediate heat treatment, and tempering, whereby steel plates were manufactured. After each of the reheating hardening, the intermediate heat treatment, and the tempering, water cooling to 200° C. or lower was performed at a cooling rate in the above-described range. The retention time of the heating of the hot rolling was set to 30 to 120 minutes, and the retention time of the heat treatments including the reheating hardening, the intermediate heat treatment, and the tempering was set to 20 to 60 minutes. Samples were taken from the steel plates after being subjected to the heat treatments, and the metallographic structure, tensile properties, and toughness thereof were evaluated.

TABLE 1

| | Chemical composition (mass %) remainder: Fe and impurities | | | | | | | | | | | | | | | | | |
|---|---|---|---|---|---|---|---|---|---|---|---|---|---|---|---|---|---|---|
| Steel | C | Si | Mn | P | S | Cu | Ni | Cr | Mo | Al | Nb | Ti | V | B | Ca | REM | N | O |
| A1 | 0.020 | 0.12 | 0.21 | 0.004 | 0.0010 | 0.05 | 13.7 | 0.03 | 0.05 | 0.020 | | | | | | | 0.0022 | 0.0012 |
| A2 | 0.070 | 0.05 | 0.26 | 0.004 | 0.0015 | | 12.9 | | | 0.015 | | | | | | | 0.0030 | 0.0018 |
| A3 | 0.035 | 0.30 | 0.51 | 0.002 | 0.0008 | | 14.0 | 0.05 | | 0.035 | 0.008 | | 0.044 | | | | 0.0034 | 0.0015 |
| A4 | 0.052 | 0.27 | 0.20 | 0.002 | 0.0010 | | 12.5 | | | 0.018 | | 0.015 | | | | | 0.0036 | 0.0014 |
| A5 | 0.030 | 0.08 | 0.80 | 0.003 | 0.0008 | 0.52 | 14.3 | | 0.15 | 0.029 | | 0.012 | | | 0.0022 | | 0.0051 | 0.0015 |
| A6 | 0.025 | 0.03 | 0.23 | 0.002 | 0.0040 | | 14.1 | 0.96 | 0.57 | 0.025 | | | | | 0.0018 | | 0.0040 | 0.0012 |
| A7 | 0.063 | 0.11 | 0.45 | 0.003 | 0.0005 | | 14.5 | 0.25 | 0.35 | 0.060 | | | | | 0.0015 | | 0.0048 | 0.0017 |
| A8 | 0.050 | 0.07 | 0.25 | 0.008 | 0.0008 | 0.15 | 14.3 | 0.08 | 0.25 | 0.015 | 0.020 | 0.020 | 0.080 | | 0.0034 | | 0.0030 | 0.0015 |
| A9 | 0.050 | 0.06 | 0.70 | 0.003 | 0.0009 | 0.97 | 15.4 | 0.15 | | 0.010 | | | | 0.0020 | | | 0.0032 | 0.0013 |
| A10 | 0.042 | 0.16 | 0.42 | 0.002 | 0.0005 | | 14.9 | 0.14 | 0.10 | 0.028 | | 0.007 | | | 0.0040 | | 0.0040 | 0.0008 |
| A11 | 0.055 | 0.04 | 0.33 | 0.003 | 0.0016 | | 13.3 | 0.63 | 0.07 | 0.030 | 0.015 | | 0.059 | 0.0005 | | 0.0050 | 0.0015 | 0.0009 |
| A12 | 0.066 | 0.22 | 0.61 | 0.003 | 0.0004 | | 13.9 | | | 0.056 | | | | | | | 0.0060 | 0.0007 |
| A13 | 0.025 | 0.09 | 0.55 | 0.005 | 0.0007 | 0.30 | 15.0 | | 0.40 | 0.047 | | 0.016 | | 0.0014 | | | 0.0041 | 0.0030 |
| A14 | 0.021 | 0.12 | 0.22 | 0.004 | 0.0008 | 0.05 | 16.8 | 0.03 | 0.05 | 0.021 | | | | | | | 0.0024 | 0.0010 |

Blank means that no element is intentionally added.

TABLE 2

| | Chemical composition (mass %) remainder: Fe and impurities | | | | | | | | | | | | | | | | |
|---|---|---|---|---|---|---|---|---|---|---|---|---|---|---|---|---|---|
| Steel | C | Si | Mn | P | S | Cu | Ni | Cr | Mo | Al | Nb | Ti | V | B | Ca | REM | N | O |
| A15 | 0.017 | 0.05 | 0.27 | 0.004 | 0.0016 | | 12.8 | | | 0.035 | | | | | | | 0.0035 | 0.0012 |
| A16 | 0.075 | 0.28 | 0.73 | 0.005 | 0.0020 | 0.37 | 14.0 | | 0.05 | 0.037 | | | | 0.0010 | | | 0.0034 | 0.0016 |
| A17 | 0.065 | 0.33 | 0.71 | 0.003 | 0.0025 | | 13.8 | 0.10 | | 0.030 | | | | | | 0.0015 | 0.0032 | 0.0008 |
| A18 | 0.026 | 0.27 | 0.18 | 0.003 | 0.0010 | | 13.7 | | | 0.029 | | 0.010 | | | | | 0.0027 | 0.0010 |
| A19 | 0.060 | 0.28 | 0.88 | 0.007 | 0.0007 | | 14.6 | 0.25 | | 0.039 | | | 0.017 | 0.0005 | 0.0013 | | 0.0036 | 0.0017 |
| A20 | 0.056 | 0.21 | 0.75 | 0.009 | 0.0035 | | 14.9 | | | 0.035 | | | | | | | 0.0041 | 0.0013 |
| A21 | 0.051 | 0.16 | 0.74 | 0.004 | 0.0043 | | 14.4 | | 0.18 | 0.016 | | | | | | | 0.0051 | 0.0008 |
| A22 | 0.065 | 0.19 | 0.72 | 0.005 | 0.0011 | | 14.5 | 1.18 | 0.45 | 0.050 | 0.012 | | | | | | 0.0050 | 0.0010 |
| A23 | 0.036 | 0.06 | 0.35 | 0.007 | 0.0015 | | 13.9 | | | 0.065 | | | | | | | 0.0052 | 0.0011 |
| A24 | 0.067 | 0.24 | 0.67 | 0.003 | 0.0021 | 0.25 | 15.0 | | | 0.022 | 0.023 | | | 0.0028 | | | 0.0033 | 0.0009 |
| A25 | 0.041 | 0.08 | 0.50 | 0.003 | 0.0006 | | 12.9 | | | 0.055 | 0.008 | 0.024 | | 0.0012 | | | 0.0065 | 0.0019 |

Blank means that no element is intentionally added.
Underline means outside the range of the present invention.

<Metallographic Structure>

As the metallographic structure, the average grain size of prior austenite grains, the average aspect ratio of the prior austenite grains, the volume fraction of an austenite phase, and an average effective grain size were obtained.

The average grain size of the prior austenite grains was measured using a section (L-section) of a thickness middle portion parallel to the rolling direction and the thickness direction as an observed section. The average grain size of the prior austenite grains was measured according to JIS G 0551. First, the observed section of the sample was corroded with a saturated aqueous solution of picric acid to reveal the prior austenite grain boundaries, and thereafter five or more visual fields were photographed with a scanning electron microscope at a magnification of 1,000-fold or 2,000-fold. After identifying the prior austenite grain boundaries using the structural photographs which were photographed, the circle equivalent grain sizes (diameters) of at least 20 prior austenite grains were obtained by image processing, and the average value thereof was determined as the average grain size of the prior austenite grains.

In addition, in the steel of the present invention, the prior austenite grain size is reduced and the P content is suppressed so that fracture is less likely to occur at the prior austenite grain boundaries. Therefore, it may be difficult to identify the prior austenite grain boundaries by corrosion. In such a case, after performing heating to 430° C. to 470° C., a heat treatment of retention for one hour or longer was performed, and then the average grain size of the prior austenite grains was measured by the method described above.

In a case where identification of the prior austenite grain boundaries is difficult even if the heat treatment at 430° C. to 470° C. is performed, a Charpy test piece was taken from the heat-treated sample, and the sample subjected to an impact test at −196° C. and fractured at the prior austenite grain boundaries was used. In this case, a cross section of a fracture surface at the section (L-section) parallel to the rolling direction and the thickness direction was created and corroded, and thereafter, the prior austenite grain sizes were measured by identifying the prior austenite grain boundaries of the cross section of the fracture surface of the thickness middle portion with the scanning electron microscope. When the prior austenite grain boundaries are embrittled by a heat treatment, minute cracks are generated at the prior austenite grain boundaries due to an impact load during the Charpy test, so that the prior austenite grain boundaries are easily identified.

The average aspect ratio of the prior austenite grains was obtained as a ratio between the maximum value (length in the rolling direction) and the minimum value (thickness in the thickness direction) of the length of the prior austenite grain boundary identified as described above. The aspect ratios of at least 20 prior austenite grains were measured, and the average value thereof was determined as the average aspect ratio of the prior austenite grains. The average grain size and average aspect ratio of the prior austenite grains were measured excluding the prior austenite grains having a grain size of less than 2.0 µm.

The volume fraction of the austenite phase was measured by taking a sample parallel to the plate surface and performing an X-ray diffraction method on the thickness middle portion. The volume fraction of the austenite phase was determined from the ratio between the integrated intensities of austenite (face-centered cubic structure) and tempered martensite (body-centered cubic structure) of X-ray peaks.

The average effective grain size was measured by using an EBSD analyzer attached to the scanning electron microscope, with the section (L-section) of the thickness middle portion parallel to the rolling direction and the thickness direction. Observation of five or more visual fields was performed at a magnification of 2,000-fold, a boundary of a metallographic structure having an orientation difference of 15° or more was regarded as a grain boundary, and grains surrounded by the grain boundaries were regarded as effective grains. Furthermore, a circle equivalent grain size (diameter) was obtained from the effective grain size area by image processing, and the average value of the circle equivalent grain sizes was determined as the average effective grain size.

<Tensile Properties>

By taking a 1A full-thickness tensile test piece specified in JIS Z 2241 whose longitudinal direction is parallel to the rolling direction (L direction), strength (yield stress and tensile strength) was measured at room temperature by the method specified in JIS Z 2241. The target value of the yield stress is 460 to 710 MPa, and the target value of the tensile strength is 560 to 810 MPa. The yield stress was a lower yield stress. However, in a case where no clear lower yield stress was observed, the 0.2% proof stress was taken as the yield stress.

Regarding the extremely low temperature toughness, in a case where the plate thickness of the steel plate was 31 mm or less, a CT test piece of full thickness with front and rear surfaces each ground 0.5 mm was taken, and in a case where the plate thickness of the steel plate exceeded 31 mm, a CT test piece with a thickness of 30 mm from the thickness middle portion was taken in a direction (C direction) perpendicular to the rolling direction. A J-R curve was created according to the unloading compliance method specified in ASTM standard E1820-13 in liquid hydrogen (−253° C.), and a J value was converted into a $K_{IC}$ value. The target value of the extremely low temperature toughness is 150 MPa·√m or more.

Tables 3 and 4 show the plate thickness, manufacturing method, base metal properties, and metallographic structure of steels (Manufacturing Nos. 1 to 37) manufactured using slabs having the chemical compositions of Steels A1 to A25 shown in Tables 1 and 2. In Table 3, in Steels Nos. 2, 4, 6 and 14, since air cooling was performed as the cooling after the hot rolling, the water cooling start temperature after the hot rolling was described as "-".

| Manu-facturing No. | Steel | Plate thickness [mm] | Heating, rolling, and heat treatment conditions | | | | | | | Metallographic structure | | | | Base metal properties | | | Note |
|---|---|---|---|---|---|---|---|---|---|---|---|---|---|---|---|---|---|
| | | | Heating temp-erature after rolling [°C.] | Cumulative rolling reduction at 950° C. or lower [%] | Rolling finishing temperature [°C.] | Water cooling start temperature after rolling [°C.] | Reheating hardening temperature [°C.] | Intermediate heat treatment temperature [°C.] | Tempering temperature [°C.] | Average grain size of prior austenite grains [μm] | Average aspect ratio of prior austenite grains | Volume fraction of austenite phase [%] | Average effective grain size [μm] | Yield stress [MPa] | Tensile strength [MPa] | Extremely low temp-erature toughness* [MPa·√m] | |
| 1 | A1 | 12 | 1180 | 95 | 820 | 600 | 860 | 600 | 530 | 13.5 | 1.7 | 10.7 | 9.4 | 524 | 620 | 168 | Present invention Example |
| 2 | A2 | 20 | 1100 | 80 | 820 | — | 720 | 600 | 550 | 9.8 | 1.8 | 9.3 | 5.9 | 487 | 580 | 175 | |
| 3 | A3 | 25 | 970 | 92 | 780 | 680 | 750 | 660 | 520 | 3.4 | 1.8 | 7.5 | 2.4 | 527 | 622 | 179 | |
| 4 | A4 | 12 | 1120 | 92 | 860 | — | 880 | 600 | 550 | 17.6 | 1.5 | 22.3 | 12.3 | 522 | 615 | 152 | |
| 5 | A5 | 32 | 1030 | 84 | 770 | 730 | 720 | 590 | 550 | 6.7 | 2.0 | 4.3 | 4.0 | 502 | 604 | 163 | |
| 6 | A6 | 32 | 1040 | 89 | 810 | — | 750 | 620 | 530 | 10.7 | 1.7 | 12.3 | 6.4 | 523 | 630 | 156 | |
| 7 | A7 | 40 | 1160 | 83 | 920 | 900 | 880 | 600 | 570 | 19.3 | 1.1 | 13.7 | 12.5 | 555 | 654 | 150 | |
| 8 | A8 | 40 | 960 | 90 | 730 | 690 | 710 | 590 | 550 | 4.8 | 2.4 | 6.7 | 3.3 | 496 | 597 | 165 | |
| 9 | A9 | 36 | 1070 | 88 | 830 | 810 | 830 | 600 | 550 | 13.7 | 1.6 | 2.0 | 8.0 | 546 | 639 | 158 | |
| 10 | A9 | 36 | 1100 | 88 | 850 | 800 | 840 | 600 | 550 | 14.8 | 1.3 | 4.5 | 11.3 | 577 | 666 | 152 | |
| 11 | A9 | 36 | 1110 | 82 | 840 | 800 | 840 | 600 | 550 | 13.2 | 1.4 | 5.4 | 10.2 | 530 | 630 | 151 | |
| 12 | A9 | 36 | 1130 | 85 | 830 | 810 | 840 | 610 | 550 | 12.5 | 1.5 | 22.6 | 6.3 | 526 | 620 | 150 | |
| 13 | A10 | 40 | 1050 | 83 | 800 | 760 | 730 | 590 | 520 | 7.7 | 1.8 | 8.6 | 5.3 | 485 | 582 | 170 | |
| 14 | A11 | 40 | 1030 | 89 | 830 | — | 780 | 590 | 520 | 12.8 | 1.5 | 8.3 | 7.6 | 477 | 580 | 160 | |
| 15 | A12 | 35 | 950 | 91 | 680 | 650 | 800 | 620 | 520 | 11.4 | 2.7 | 9.7 | 7.7 | 478 | 574 | 172 | |
| 16 | A13 | 36 | 950 | 90 | 650 | 620 | 770 | 570 | 550 | 9.5 | 2.9 | 3.2 | 6.0 | 514 | 615 | 162 | |
| 17 | A14 | 12 | 1180 | 95 | 820 | 600 | 860 | 600 | 530 | 10.1 | 1.4 | 13.4 | 6.5 | 551 | 642 | 177 | |

Extremely low temperature toughness is the $K_{JC}$ value (converted from J value) in liquid hydrogen (−253° C.), the unit is MPa·√m.

TABLE 4

| Manu-facturing No. | Steel | Plate thickness [mm] | Heating temp-erature after rolling [°C] | Cumulative rolling reduction at 950°C or lower [%] | Rolling finishing temperature [°C] | Water cooling start temperature after rolling [°C] | Reheating hardening temperature [°C] | Intermediate heat treatment temperature [°C] | Tempering temperature [°C] | Average grain size of prior austenite grains [μm] | Average aspect ratio of prior austenite grains | Volume fraction of austenite phase [%] | Average effective grain size [μm] | Yield stress [MPa] | Tensile strength [MPa] | Extremely low temperature toughness* [MPa·√m] | Note |
|---|---|---|---|---|---|---|---|---|---|---|---|---|---|---|---|---|---|
| 18 | <u>A15</u> | 36 | 1100 | 82 | 840 | 810 | 800 | 610 | 530 | 12.1 | 1.3 | 11.6 | 9.6 | <u>452</u> | <u>555</u> | <u>81</u> | Comparative Example |
| 19 | <u>A16</u> | 40 | 1080 | 86 | 850 | 820 | 750 | 580 | 520 | 9.2 | 1.5 | 8.3 | 5.5 | 524 | <u>625</u> | <u>79</u> | |
| 20 | <u>A17</u> | 40 | 1060 | 87 | 860 | 840 | 760 | 590 | 530 | 9.8 | 1.2 | 9.1 | 6.6 | 517 | 616 | <u>78</u> | |
| 21 | <u>A18</u> | 40 | 1090 | 80 | 850 | 830 | 750 | 600 | 530 | 9.4 | 1.4 | 9.7 | 7.6 | <u>455</u> | <u>552</u> | 86 | |
| 22 | <u>A19</u> | 40 | 1070 | 84 | 880 | 850 | 770 | 580 | 550 | 11.6 | 1.1 | 6.3 | 6.9 | 546 | <u>655</u> | 85 | |
| 23 | <u>A20</u> | 40 | 1080 | 85 | 830 | 800 | 750 | 580 | 550 | 8.9 | 1.3 | 5.4 | 6.2 | 492 | 588 | 82 | |
| 24 | <u>A21</u> | 40 | 1070 | 83 | 820 | 800 | 720 | 580 | 520 | 9.3 | 1.8 | 7.5 | 6.2 | 520 | 623 | <u>68</u> | |
| 25 | <u>A22</u> | 40 | 1120 | 82 | 850 | 810 | 740 | 590 | 530 | 7.7 | 1.4 | 10.2 | 4.6 | 576 | 677 | 135 | |
| 26 | <u>A23</u> | 40 | 1070 | 80 | 860 | 830 | 740 | 590 | 520 | 7.4 | 1.2 | 7.9 | 5.6 | 463 | 562 | <u>56</u> | |
| 27 | <u>A24</u> | 40 | 1120 | 89 | 760 | 740 | 760 | 570 | 550 | 10.2 | <u>3.0</u> | 5.2 | 6.9 | 500 | 597 | 102 | |
| 28 | <u>A25</u> | 40 | 1080 | 80 | 870 | 840 | 800 | 610 | 520 | 12.3 | 1.1 | 7.7 | 9.2 | 465 | 564 | <u>54</u> | |
| 29 | A8 | 40 | 930 | 90 | 640 | 600 | 760 | 610 | 530 | 3.5 | <u>3.0</u> | 10.0 | <u>2.5</u> | <u>715</u> | <u>817</u> | 88 | |
| 30 | A7 | 40 | 1210 | 83 | 830 | 800 | 860 | 570 | 520 | <u>22.8</u> | 1.4 | 8.8 | <u>14.1</u> | 566 | 668 | 134 | |
| 31 | A7 | 40 | 1140 | <u>45</u> | 900 | 870 | 850 | 590 | 550 | <u>26.8</u> | 1.2 | 6.5 | <u>16.1</u> | 568 | 672 | 117 | |
| 32 | A7 | 40 | 1130 | 83 | 930 | 900 | 860 | 580 | 520 | <u>23.5</u> | 1.0 | 8.6 | <u>14.3</u> | 574 | 677 | 127 | |
| 33 | A7 | 36 | 1080 | 83 | 840 | 800 | 900 | 570 | 550 | <u>24.7</u> | 1.3 | 5.4 | <u>15.0</u> | 555 | 646 | 123 | |
| 34 | A7 | 40 | 1140 | 83 | 830 | 800 | 850 | 650 | 520 | 8.6 | 1.4 | <u>1.9</u> | 5.9 | 587 | 689 | 104 | |
| 35 | A7 | 40 | 1140 | 83 | 830 | 800 | 850 | 550 | 520 | 8.3 | 1.3 | 8.8 | 5.6 | 584 | 683 | 107 | |
| 36 | A7 | 40 | 1140 | 83 | 830 | 800 | 850 | 610 | 580 | 8.7 | 1.5 | 8.8 | 6.0 | <u>712</u> | <u>814</u> | 72 | |
| 37 | A7 | 40 | 1140 | 83 | 830 | 800 | 850 | 570 | <u>500</u> | 8.8 | 1.4 | 8.8 | 5.6 | <u>724</u> | <u>827</u> | 74 | |

Underline means outside the range of the present invention.
Extremely low temperature toughness* is the $K_{IC}$ value (converted from J value) in liquid hydrogen (−253° C.), the unit is MPa·√m.

As is apparent from Tables 3 and 4, in Steel Nos. 1 to 17, the yield stress at room temperature, the tensile strength at room temperature, and the toughness at −253° C. satisfied the target values.

In Steel No. 4 in Table 3, since the tempering temperature was higher than the preferable range, there was a large fraction of austenite phase. In addition, the reheating hardening temperature was high although being within the preferable range, so that the prior austenite grain size became larger and the effective grain size also became larger. As a result, the extremely low temperature toughness had slightly decreased.

In Steel No. 7, the finishing temperature of the hot rolling was higher than the preferable range, the effective grain size became large, and the extremely low temperature toughness had slightly decreased.

In each of Steels Nos. 10 and 11, the intermediate heat treatment temperature was outside the preferable range, the austenite phase was slightly small although being within the range of the present invention, and the extremely low temperature toughness had slightly decreased.

In Steel No. 12, since the tempering temperature was higher than the preferable range, the austenite phase was slightly large although being within the range of the present invention, and the extremely low temperature toughness had slightly decreased.

On the other hand, in Steel No. 18 in Table 4, the C content was small, and in Steel No. 21, the Mn content was small, so that the strength was low and the extremely low temperature toughness had also decreased. In each of Steels Nos. 19, 20, and 22 to 26, the C content, Si content, Mn content, P content, S content, Cr content, and Al content were large, and the extremely low temperature toughness had decreased.

In Steel No. 27, the Nb content and the B content were large, and the extremely low temperature toughness had decreased.

In Steel No. 28, the Ti content and the N content were large, and the extremely low temperature toughness had decreased.

Steels Nos. 29 to 33 are examples in which the manufacturing conditions deviating from the preferable ranges were adopted, and as a result, the average grain size or average aspect ratio of the prior austenite grains deviated from the range of the present invention, so that the extremely low temperature toughness had decreased.

In Steel No. 29, the heating temperature during the hot rolling was low, and the yield stress and tensile strength were too high, so that the extremely low temperature toughness had decreased.

In Steel No. 30, the heating temperature during the hot rolling was high, the average grain size of the prior austenite grains had increased, and the average effective grain size had also increased, so that the extremely low temperature toughness had decreased.

In Steel No. 31, the rolling reduction at 950° C. or lower was small, the average grain size of the prior austenite grains had increased, and the average effective grain size had increased, so that the extremely low temperature toughness had decreased.

In Steel No. 32, the finishing temperature of the hot rolling was high, the average grain size of the prior austenite grains had increased, and the average effective grain size had also increased, so that the extremely low temperature toughness had decreased.

In Steel No. 33, the reheating hardening temperature was high, the average grain size of the prior austenite grains had increased, and the average effective grain size had also increased, so that the extremely low temperature toughness had decreased.

In Steel No. 34, the intermediate heat treatment temperature was high, the volume fraction of the austenite phase was small, and the extremely low temperature toughness had decreased.

In Steel No. 35, the intermediate heat treatment temperature was low, the volume fraction of the austenite phase was small, and the extremely low temperature toughness had decreased.

In Steel No. 36, the tempering temperature was high, and the yield stress and tensile strength were too high, so that the extremely low temperature toughness had decreased.

In Steel No. 37, the tempering temperature was low, and the yield stress and tensile strength were too high, so that the extremely low temperature toughness had decreased.

INDUSTRIAL APPLICABILITY

When a nickel-containing steel for low temperature of the present invention is used in a liquid hydrogen tank, the plate thickness of a steel plate for the tank can be made thinner than that of austenitic stainless steel. Therefore, according to the present invention, it is possible to achieve an increase in the size and a reduction in the weight of the liquid hydrogen tank, an improvement in heat insulation performance by a reduction in surface area with respect to volume, an effective use of the tank site, an improvement in the fuel efficiency of a liquid hydrogen carrier, and the like. Furthermore, compared to the austenitic stainless steel, the nickel-containing steel for low temperature of the present invention has a small coefficient of thermal expansion, so that the design of a large tank is not complex and the tank manufacturing cost can be reduced. As described above, the industrial contribution of the present invention is extremely remarkable.

The invention claimed is:

1. A nickel-containing steel for low temperature comprising, as a chemical composition, by mass %:
    C: 0.020% to 0.070%;
    Si: 0.03% to 0.30%;
    Mn: 0.20% to 0.80%;
    Ni: 12.5% to 17.4%;
    Al: 0.010% to 0.060%;
    N: 0.0015% to 0.0060%;
    O: 0.0007% to 0.0030%;
    Cu: 0% to 1.00%;
    Cr: 0% to 1.00%;
    Mo: 0% to 0.60%;
    Nb: 0% to 0.020%;
    V: 0% to 0.080%;
    Ti: 0% to 0.020%;
    B: 0% to 0.0020%;
    Ca: 0% to 0.0040%;
    REM: 0% to 0.0050%;
    P: 0.008% or less;
    S: 0.0040% or less; and
    a remainder including Fe and impurities,
    wherein a metallographic structure contains 2.0% to 30.0% of an austenite phase by volume fraction %, and a total volume fraction of the austenite phase and a tempered martensite phase in the metallographic structure is 99% or more,
    in a middle plane in a thickness direction of a section parallel to a rolling direction and the thickness direction, an average grain size of prior austenite grains, measured in accordance with JIS G 0551, is 3.0 μm to 20.0 μm, and an average aspect ratio of the prior austenite grains is 1.0 to 2.9, wherein the aspect ratio of the prior austenite grains is defined as:
    length of the prior austenite grains in the rolling direction/thickness of the prior austenite grains in the thickness direction, and
a yield stress at room temperature, measured in accordance with JIS Z 2241, is 460 MPa to 710 MPa, and a tensile strength at room temperature, measured in accordance with JIS Z 2241, is 560 MPa to 810 MPa.

2. The nickel-containing steel for low temperature according to claim 1 comprising, as the chemical composition, by mass %:
    Mn: 0.20% to 0.50%.

3. The nickel-containing steel for low temperature according to claim 1,
    wherein the average grain size of the prior austenite grains, measured in accordance with JIS G 0551, is 3.0 μm to 15.0 μm.

4. The nickel-containing steel for low temperature according to claim 1,
    wherein an average effective grain size is 2.0 μm to 12.0 μm, and
    wherein said average effective grain size is measured by taking a sample from the steel after tempering, and observing five or more visual fields at a magnification of 2,000-fold using an electron backscatter diffraction analyzer,
    wherein an effective grain is defined as a grain surrounded by a grain boundary, and a grain boundary is defined as a boundary of a metallographic structure having an orientation difference of 15° or more, and
    a circle equivalent grain size is obtained from multiple areas of effective grains by image processing, and an average value of said obtained circle equivalent grain sizes represents said average effective grain size.

5. The nickel-containing steel for low temperature according to claim 1,
    wherein a plate thickness is 4.5 mm to 40 mm.

6. The nickel-containing steel for low temperature according to claim 2,
    wherein the average grain size of the prior austenite grains is 3.0 μm to 15.0 μm.

7. The nickel-containing steel for low temperature according to claim 2,
    wherein an average effective grain size is 2.0 μm to 12.0 μm, and
    wherein said average effective grain size is measured by taking a sample from the steel after tempering, and observing five or more visual fields at a magnification of 2,000-fold using an electron backscatter diffraction analyzer,
    wherein an effective grain is defined as a grain surrounded by a grain boundary, and a grain boundary is defined as a boundary of a metallographic structure having an orientation difference of 15° or more, and
    a circle equivalent grain size is obtained from multiple areas of effective grains by image processing, and an average value of said obtained circle equivalent grain sizes represents said average effective grain size.

8. The nickel-containing steel for low temperature according to claim 3,
    wherein an average effective grain size is 2.0 μm to 12.0 μm, and
    wherein said average effective grain size is measured by taking a sample from the steel after tempering, and observing five or more visual fields at a magnification of 2,000-fold using an electron backscatter diffraction analyzer,
    wherein an effective grain is defined as a grain surrounded by a grain boundary, and a grain boundary is defined as a boundary of a metallographic structure having an orientation difference of 15° or more, and
    a circle equivalent grain size is obtained from multiple areas of effective grains by image processing, and an average value of said obtained circle equivalent grain sizes represents said average effective grain size.

9. The nickel-containing steel for low temperature according to claim 6,
    wherein an average effective grain size is 2.0 μm to 12.0 μm, and
    wherein said average effective grain size is measured by taking a sample from the steel after tempering, and observing five or more visual fields at a magnification of 2,000-fold using an electron backscatter diffraction analyzer,
    wherein an effective grain is defined as a grain surrounded by a grain boundary, and a grain boundary is defined as a boundary of a metallographic structure having an orientation difference of 15° or more, and
    a circle equivalent grain size is obtained from multiple areas of effective grains by image processing, and an average value of said obtained circle equivalent grain sizes represents said average effective grain size.

10. The nickel-containing steel for low temperature according to claim 2,
    wherein a plate thickness is 4.5 mm to 40 mm.

11. The nickel-containing steel for low temperature according to claim 3,
    wherein a plate thickness is 4.5 mm to 40 mm.

12. The nickel-containing steel for low temperature according to claim 4,
    wherein a plate thickness is 4.5 mm to 40 mm.

13. The nickel-containing steel for low temperature according to claim 6,
    wherein a plate thickness is 4.5 mm to 40 mm.

14. The nickel-containing steel for low temperature according to claim 7,
    wherein a plate thickness is 4.5 mm to 40 mm.

15. The nickel-containing steel for low temperature according to claim 8,
    wherein a plate thickness is 4.5 mm to 40 mm.

16. The nickel-containing steel for low temperature according to claim 9,
    wherein a plate thickness is 4.5 mm to 40 mm.

* * * * *